Aug. 26, 1930.　　　　C. J. KERTESZ　　　　1,774,145
SPARK PLUG TESTING DEVICE
Filed June 25, 1927　　　2 Sheets-Sheet 1
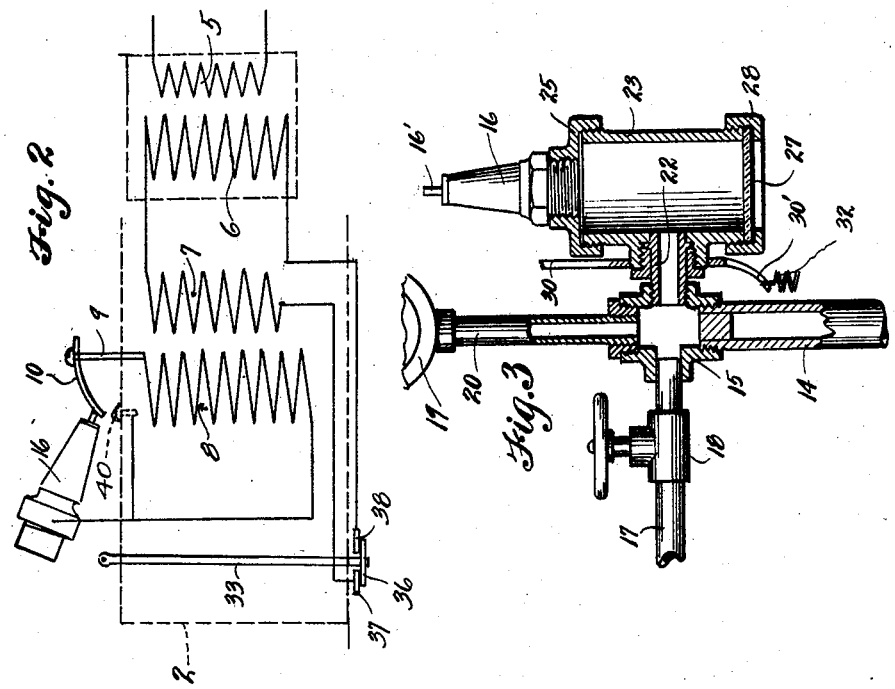
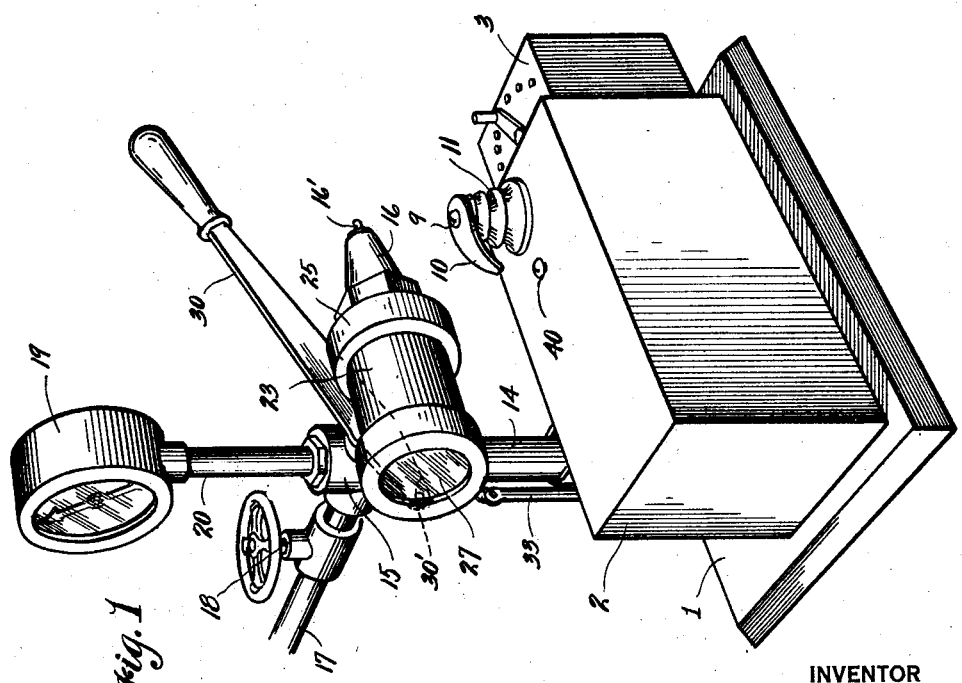
INVENTOR
CHARLES J. KERTESZ
BY
Cook & Robinson
ATTORNEY Aug. 26, 1930.  C. J. KERTESZ  1,774,145
SPARK PLUG TESTING DEVICE
Filed June 25, 1927  2 Sheets-Sheet 2
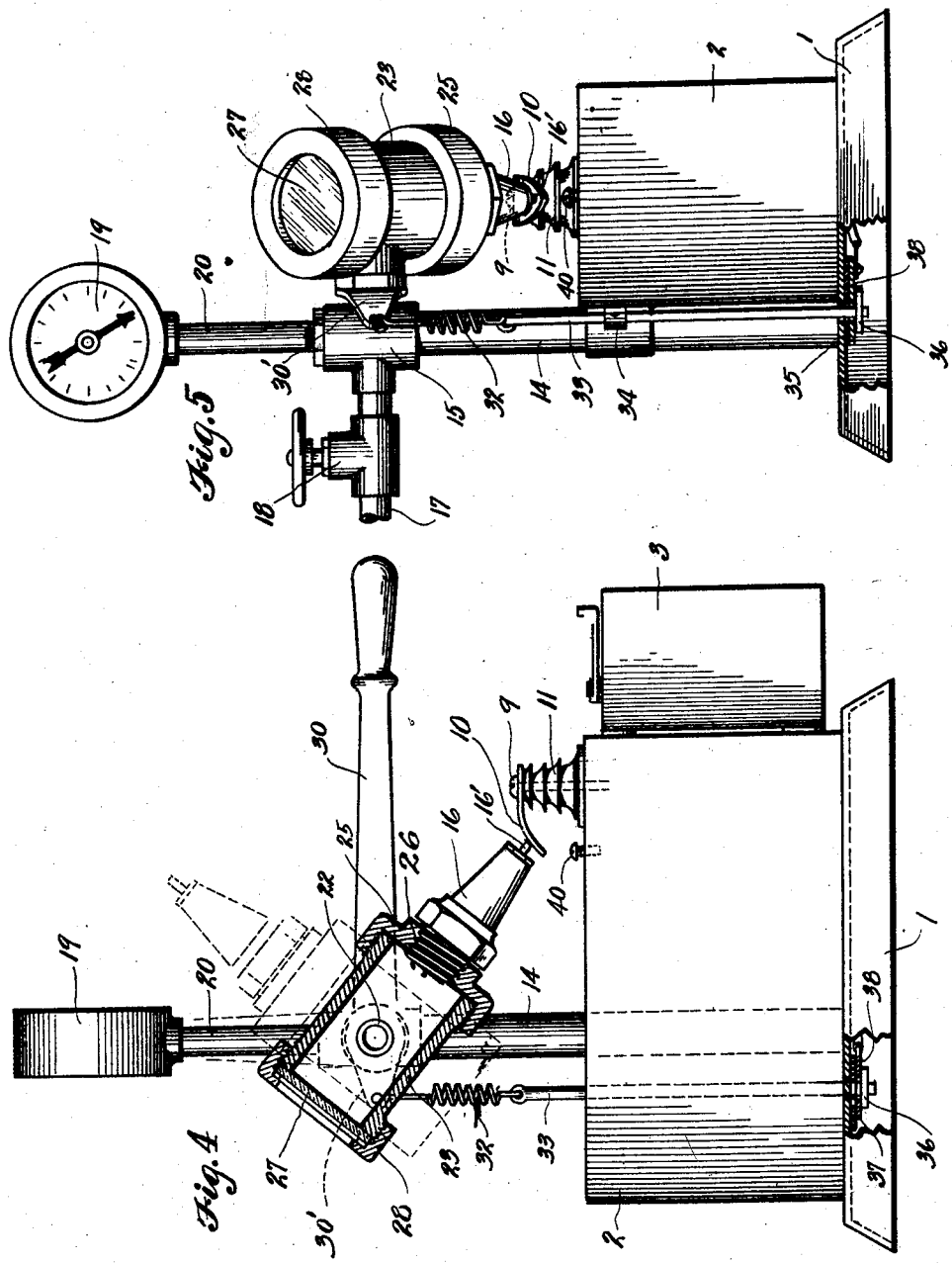
INVENTOR
CHARLES J. KERTESZ
BY
Cook & Robinson
ATTORNEY Patented Aug. 26, 1930

1,774,145

UNITED STATES PATENT OFFICE

CHARLES J. KERTESZ, OF SEATTLE, WASHINGTON

SPARK-PLUG-TESTING DEVICE

Application filed June 25, 1927. Serial No. 201,512.

This invention relates to means for testing spark plugs, ignition coils and the like, and has for its principal object to provide a testing device whereby the spark plugs may be tested under compression. Heretofore, many devices have been made for testing spark plugs but none, to my knowledge, has been provided for testing under compression, but on the contrary, test under ordinary atmospheric pressure. It very frequently happens that a spark plug will pass a very satisfactory test when in atmospheric pressure but will fail entirely when placed under working conditions; this being due to the fact that when actually in use they are under high compression at the time the spark is produced.

In view of the above, it has been the object of this invention to provide means whereby spark plugs may be tested under compression to the same degree, or greater, than that to which they are subjected when placed under working conditions in an engine, and to so construct the testing device that the results may be visibly observed.

More specifically stated, it is the object of this invention to provide a testing device as above stated, comprising a pressure chamber into which the sparking end of the plug to be tested may be threaded and which is provided with a glass panel through which the course and intensity of the spark may be observed when a circuit is closed through the plug, the chamber also being provided with means for admitting air under pressure thereto to any desired degree and for retaining it during a test.

Another object of the invention is to provide a switch mechanism for the testing circuit which closes automatically incidental to the adjustment of the plug to testing position.

Other objects of the invention reside in the various details of construction, combination of parts and in the mode of operation of the device as is hereinafter described.

In accomplishing these objects, I have provided the improved details of construction, the preferred forms of which are illustrated in the accompanying drawings, wherein—
Figure 1 is a perspective view of a spark plug tester embodied by the present invention.

Figure 2 is a diagrammatic view of the testing circuit connections and wiring.

Figure 3 is a detail, sectional view of the compression cylinder in which the plugs are mounted for testing and its connections for admitting air pressure thereto.

Figure 4 is a side view of the device, showing the spark plug holder in section and with the spark plug in position for testing.

Figure 5 is an end view of the device as shown in Figure 4.

Referring more in detail to the drawings—

1 designates a flat, rectangular base plate on which a coil box 2 is mounted, and 3 designates a step-down transformer of any desirable character whereby an electric circuit, which may be the usual city lighting circuit, of 110 volts, may be reduced to a six-volt circuit, or to a circuit which is suitable for the present purpose.

As is illustrated diagrammatically in Figure 2, the transformer comprises a primary winding 5 which is connected at its ends with the supply, or city circuit, and a secondary winding 6 which is connected at its ends with the opposite ends of the primary winding 7 of the testing circuit embodied in the coil box; one of these connections being made through a normally open switch mechanism which will presently be described. The secondary winding 8 of the testing circuit is grounded at one end to the metallic base plate 1 and at its other end connects, by means of a screw 9 or binding post, with a contact plate 10 that is mounted, by means of the screw on an insulator 11, on top of the box 2.

Supported at one side of the coil box and resting at its lower end against the base plate 1 to provide an electrical connection, is a metal standard, or tube, 14 provided at its upper end with a pipe fitting 15 with which a pipe 17 leading from a source of air under pressure is connected; this pipe 17 being equipped with a control valve 18. A pressure gauge 19 is also connected with the top of the fitting 15, by means of a pipe 20, and extending horizontally from the fitting and over the coil box 2, is a short pipe connection 22 on the end of which a pressure cylinder 23 is rotatably mounted in such manner that the axial line of the cylinder may rotate in a vertical plane, passing through the contact plate 10 and screw 9.

One end of the compression cylinder 23 is equipped with a cap 25 having a threaded central opening 26 through which the end of a spark plug, as designated at 16, to be tested may be threaded, and the other end of the cylinder is tightly closed by means of a glass panel 27 that is held in place by a clamping collar 28 threaded onto the cylinder. The glass panel is provided in order that a person making the test may see the inner end of the spark plug while a test is being made and may observe the intensity and course of the spark or ascertain whether or not a spark is produced.

Fixed relative to the cylinder 23 about the pipe connection 22, is a lever 30 having an extended handle by means of which the cylinder may be rotated on its mounting to bring the outer end of the central contact 16' of the spark plug from and against the plate 10. The inner end of the lever has a short extension 30' and this is connected, through a tension spring 32, with the upper end of a vertically disposed switch rod 33 that is mounted slidably in guides 34 fixed on the side of the coil box. The lower end of this rod is extended through an insulating block 35 fixed on the under side of the base 1 and it is equipped with a flat switch contact 36 adapted to be pulled against contacts 37 and 38 mounted on the block and through which a circuit through the primary winding of the testing circuit is closed. This induces the high tension testing circuit through the secondary winding 8.

Assuming the device to be so constructed, it is used as follows: The spark plug to be tested is threaded into the end of the pressure cylinder 23 and then the valve 18 is opened to admit air to a desired pressure into the cylinder. The lever 30 is then actuated downwardly so as to rotate the cylinder in such manner as to bring the outer end of the central contact 16' of the spark plug against the plate 10, as in Figure 4. At the same time the switch rod 33 is moved upwardly and closes a circuit through the primary winding 7 of the testing coil, and this induces the current through the secondary winding and through the spark plug. By observation through the glass panel of the pressure cylinder, the condition of the spark plug may be determined; that is, the observer may see whether or not any spark passes the terminals, or whether the circuit is grounded through the plug due to carbon, defective insulators, or for other reasons. Air may be admitted to the cylinder to any desired pressure, and this pressure determined by reference to the gauge 19. With this device it is possible for the person making the test to observe the course of the spark and just at what pressure it ceases. It is also possible to detect faulty insulation and short circuits.

The switch mechanism here provided, being connected with the lever 30, automatically opens the testing circuit as soon as the plug is adjusted away from the contact 10 by upward swinging of the lever 30.

To provide for testing plugs of various lengths, the contact plate 10 is of considerable length and curves downwardly toward the housing 2 and comes to a point. Also, to provide a safety gap across which the testing circuit may jump in the event resistance through the plug is too great, I have threaded a screw 40 in the top of the housing 2 directly below the point of plate 10; the length of the gap being adjustable by threading the head of the screw onto or away from the point of the plate 10. This screw is connected in the secondary winding 8, as shown in Figure 2.

While the device is illustrated as for testing spark plugs, it may also be used for testing any similar device which may be used in like manner for producing a spark in an internal combustion engine. Also, it is very useful for testing the output of ignition coils by connecting the latter in the secondary circuit 8 between the spark plug terminal 16' and the contact plate 10.

It is to be understood also that various testing mediums other than air may be used in the cylinder for the reason that various gases may be more desirable for making tests in some instances.

Since it is readily apparent that various changes in the details of construction could be made without departing from the spirit of the invention, I do not desire the claims to be limited only to the device as herein shown but to cover broadly a means for testing a spark plug, or other ignition device, under pressure.

Having thus described my invention, what I claim as new therein and desire to secure by Letters-Patent, is:

1. A device of the character described comprising an adjustably supported pressure chamber within which a testing medium may be maintained under pressure, means for mounting a spark plug in position for testing in the chamber, a fixed contact and a testing circuit connected with the contact and with the pressure chamber and adapted to be closed through the plug or opened by adjustment of the pressure chamber that brings the outer end terminal of the plug against or from the fixed contact.

2. A device of the character described comprising a rotatably mounted pressure cylinder, means for admitting a pressure medium thereto, an opening in the cylinder for mounting a spark plug with its sparking terminals exposed to the pressure, a transparent wall in the cylinder through which the terminal end of the plug may be observed, a fixed contact, a testing circuit connected with the contact and with the pressure cylinder and means for rotatably moving the cylinder to press the outer terminal of a plug mounted therein from or against the contact.

3. A device of the character described comprising a rotatably mounted pressure cylinder, means for admitting a pressure medium thereto, an opening in the cylinder for mounting a spark plug with its sparking terminals exposed to the pressure, a transparent wall in the cylinder through which the terminal end of the plug may be observed, a fixed contact, a testing circuit connected with the contact and with the pressure cylinder and means for rotatably moving the cylinder to press the outer terminal of a plug mounted therein from or against the contact, and a circuit control switch operable from open to closed positions by movement of the cylinder which brings the spark plug terminal against or from the fixed contact.

4. A spark plug testing device comprising a pressure cylinder, a pipe rotatably supporting the cylinder having connection with a pressure medium, a control valve in the pipe, an opening in the cylinder for mounting a spark plug, a glass panel in the cylinder through which the sparking terminals of the plug may be observed, a fixed contact against and from which the outer terminal of the spark plug may be engaged by rotatable movement of the cylinder, a testing circuit having connection with the contact and with the cylinder, a control switch for the circuit, a lever fixed to the cylinder whereby it may be adjusted and means connecting the lever and switch for closing the latter when the spark plug terminal is brought against the contact plate.

Signed at Seattle, Washington, this 16th day of June, 1927.

CHARLES J. KERTESZ.